United States Patent Office 3,007,207
Patented Nov. 7, 1961

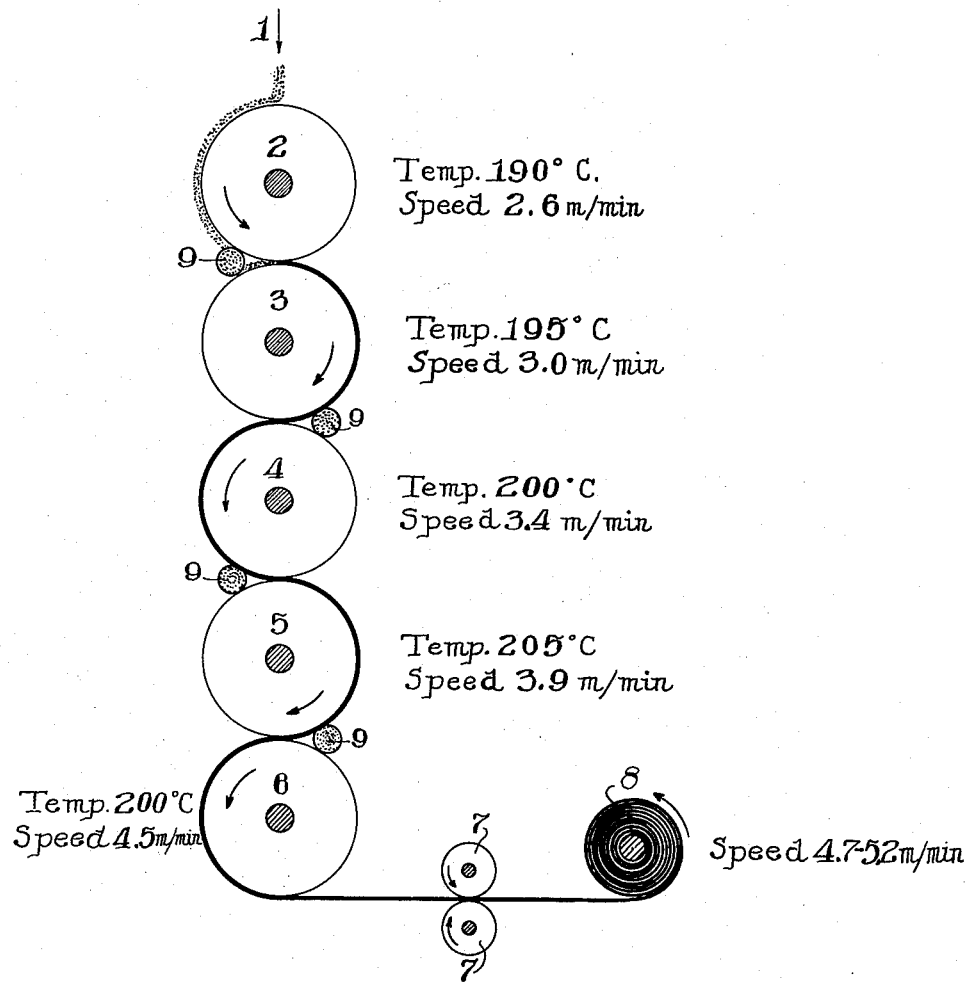

3,007,207
PROCESS FOR THE MANUFACTURE OF FOILS OF THERMOPLASTIC, AT LEAST PARTIALLY CRYSTALLINE ORGANIC POLYMERS ON A CALENDER
Josef Ferdinand Salhofer, Burgkirchen, Upper Bavaria, Germany, assignor to Farbwerke Hoechst Aktiengesellschaft vormals Meister Lucius & Bruning, Frankfurt am Main, Germany, a corporation of Germany
Filed Sept. 9, 1958, Ser. No. 759,864
Claims priority, application Germany Sept. 12, 1957
11 Claims. (Cl. 18—57)

The present invention relates to a process for the manufacture of foils, bands and similar shaped structures of thermoplastic, crystalline or partially crystalline organic high polymers, especially polyethylene, on a calender.

It is known to make thermoplastic polymers such as polyvinyl chloride which may contain a plasticizer into foils on a calender. For this purpose, the thermoplastic material is made into a homogeneous mass by means of heat and pressure and then worked up into foils by passing it through between the rolls of the calender. Attempts to produce foils of polyethylene or another polymer of that type on a calender have, however, failed. This failure is due to the fact that polyethylene and other high polymers showing the same behavior are not thermoplasts but substances of crystalline or partially crystalline character which have a pronounced melting point. Such crystalline polymers, especially polyethylene, could hitherto only be worked up into foils by the blowing process.

Now I have found that foils, bands and similar shaped structures of crystalline or partially crystalline polymers, especially polyethylene, can be produced on a calender by proceeding as follows:

(1) the surfaces of all the rolls of the calender are heated to and kept at a temperature above the crystallite melting point of the polymer to be treated;

(2) the calender rolls are adjusted in a manner such that the speed of each roll is at least 1.15 times the speed of the preceding roll and the speed ratio between the first roll and the last roll is at least 1:1.5, and preferably at least 1:2;

(3) the temperature at the surfaces of the rolls and the speed of the rolls are adjusted to one another in a manner such that the kneading mass of polymer accumulating in front of the slits between the rolls rotates within itself.

The crystallite melting point of a polymer to be treated can be determined by the break in the curve of a diagram showing in a right-angled coordinate system the specific volume of the polymer in relation to the temperature. Uberreiter and Orthmann (Koll. Z., volume 128 (1952), page 125) teach a method of determining the crystalline portion of polyethylene and consequently the crystallite melting point by means of such volume/temperature curves.

Heating the surfaces of the rolls to a temperature above the crystallite melting point of the material to be treated means to apply a temperature such that the polymer is at a temperature above its crystallite melting point and consequently in the range of plastic flow during its passage through the calender.

The process of the invention can be carried out even on a calender of three or four rolls. Advantageously a five roll calender is used. The above indicated minimum speed ratio between each roll and the preceding roll is necessary in order to pass the material through the slits between successive rolls.

When a known usual, modern calender is used the speed ratio between the first roll and the last roll can be adjusted to at most 1:1.5. The number of rolls may vary between 3 and 5 and the ratio of 1:1.5 may already be adjusted between two successive rolls. This ratio is, however, not sufficient for the process of the invention. The calender must be adjusted in a manner such that the speed ratio between two successive rolls is at least 1:1.15 and the speed ratio between the first and the last roll of a five roll calender is advantageously at least 1:2, which ratio is to be maintained throughout the whole working-up.

Within the limits set forth above, the temperature of the surfaces of the rolls and the speed of the rolls are to be adjusted to one another in a manner such that the kneading mass accumulating in front of the slits between the rolls rotates within itself. For this purpose, the temperature of the rolls is slowly raised—while maintaining the roll velocity—until the rotation of the kneading mass is perceptible. In special cases it may be advantageous to raise not only the temperature of the surfaces of the rolls but to increase also the roll friction. As soon as the kneading mass can be seen rotating within itself, all working conditions have been properly adjusted to one another and a foil of unobjectionable quality is obtained.

The process of the invention can be advantageously used for working up so-called high density polyolefins (low pressure polyolefins) on a calender. By high density polyolefins there are meant polymers of ethylene, propylene and their homologs which have been prepared under mild conditions of temperature and pressure, for example Ziegler polyethylene which is produced in the presence of catalyst systems consisting of a compound of a metal of sub-groups IV to VI of the periodic table and an organometallic compound of an alkali metal, alkaline earth metal, earth metal or zinc (cf. Belgian Patents Nos. 533,362 and 534,792). High density polyethylenes are distinguished by a great crystalline portion of about 80% and a high density of at least about 0.94, preferably 0.95 to 0.96. The molecular weight of a polyethylene of this type may amount to up to 3,000,000. Of particular technical interest are those types whose molecular weight is within the range of about 50,000 to about 100,000. The process of the invention is of course also applicable to copolymers of ethylene and propylene as well as mixtures of different polyolefins, for example of high density polyethylene and low density polyethylene or polyethylene and polypropylene.

When high density polyethylene is used, the calender temperature according to the invention is at 130 to 190° C. and 7 to 25 meters of a foil 1 millimeter thick leave the calender per minute. To the higher calender temperature there corresponds a higher calender speed, i.e. a greater quantity of material is produced in a given time.

Since the polymer is worked up at a temperature above its crystallite melting point it is practically fusible when on the calender and runs rapidly on the rolls. To prevent it from flowing down the front surfaces of the rolls, the slits between the individual rolls may be bordered along their free width by appropriate means, for example by wedges or cheeks which are provided at the rolls and movable in the direction of the roll axis so that the fusible material cannot flow down at the sides. A more suitable method is to supply the polymer to the feed roll only in a width which is considerably narrower than the working width of the calender. When, for example, a five roll calender is used, the feed width of the first roll should not exceed 60% of the width of the roll body so that the polymer will spread on the fifth roll just to the full working width.

Under the working conditions described above the foil leaving the calender is at a temperature above its crystallite melting point and is still very soft and in the plastic state. It is therefore possible to stretch the foil, immediately after it has left the calender, in the plastic state in the longitudinal direction and/or in a direction transverse thereto without molecular orientation, so reducing the thickness of the foil while practically maintaining its physical properties.

It is also possible to reheat the foil, after cooling, once or repeatedly to a temperature above the crystallite melting point of the material and then to stretch the still plastic material once or repeatedly, in an appropriate device, in the longitudinal direction and/or in a direction transverse thereto, while reducing the thickness of the foil but without causing molecular orientation.

Stretching is carried out by means of known aggregates of draw-off rolls the peripheral speed of which is advanced to such a degree as corresponds to the desired extent of stretch. The ratio of the peripheral speed of two successive draw-off rolls may be up to about 1:10.

The surfaces of the draw-off rolls are suitably provided with hard rubber which has been applied to the rolls by vulcanization and must be of a nature such that the foil does not adhere to it. The interior of the draw-off rolls should be provided with circulating conduits for a heating or cooling liquid.

If a final product containing a greater crystalline portion is to be obtained, the draw-off rolls are suitably kept at a temperature above 100° C. but below the crystallite melting point of the material, in the case of high density polyethylene for example at 100 to 127° C. If it is desired to obtain a product having a small crystalline portion, the temperature of the draw-off rolls is kept below 100° C. The lower the temperature of the draw-off rolls, the greater the transparency of the foil. In special cases it may be of advantage directly to introduce the foil into a cooling liquid after it has left the calender.

The foils prepared by the process of the invention may also be stretched in known manner in the longitudinal direction and/or in a direction transverse thereto with molecular orientation at a temperature within the range of stretch which in the case of polyethylene, for example, is between 40 and 125° C. In this case the foils are cooled under tension. By this stretching operation in the range of stretch and the molecular orientation occurring thereby the tensile strength of the foil is essentially increased. When exposed to elevated temperatures, these foils, however, shrink in the direction or directions of stretch.

When treating the foils in accordance with the process of the invention at a temperature above the crystallite melting point of the material, case must be taken that the foils do not undergo undesired deformation in this state under the action of their own weight, i.e. that they are not elongated. The foils should therefore not be suspended over a relatively long distance on their passage through the calender but must be led over supports which are at most about 50 cm. apart from one another, in order to prevent the foils from sagging. The individual conveying rolls and also the draw-off rolls used for stretching the foils must therefore be sufficiently near each other or conveyor belts of tissue, metal or artificial material are to be disposed which are provided, for example, with a coating of polytetrafluorethylene or silicones to prevent the foils from adhering to the surface of the conveyor belts.

The foils which have been treated at a temperature within the range of plastic flow are subsequently to be cooled down to a temperature below the crystallite melting point, advantageously to a temperature below 50° C. By varying the rapidity and the degree of the cooling which, if desired, may have the character of a chilling, the crystallite size, the degree of crystallinity and the molecular structure of the foils and consequently their physical behavior can be influenced. It may also be of advantage repeatedly to reheat the material above its crystallite melting point and subsequently to chill it down to a temperature below the crystallite melting point.

As apparatus suitable for carrying out the subsequent thermal treatment there may be used ducts for hot, warm or cold air through which the foils are conveyed on rolls or conveyor belts or without any support, with or without tension, with or without lateral guide members and with or without being stretched in the longitudinal direction and/or in a direction transverse thereto. Instead of ducts, there may, in principle, also be used heating, warming or cooling rolls which may be arranged in pairs or in any other appropriate combination.

The accompanying drawing shows schematically the speed and the temperature of the rollers of a calender used according to the present invention. The numerical values are taken from Example 2 and it wil be obvious from this that the distribution of temperatures and speeds of the different calender rollers has only exemplary character. Other combinations of temperature and speed values which fall into the scope of the invention are also possible. The polymer is fed as a powder 1 to the roller 2 which is heated to 190° C. and runs with a peripheral speed of 2.6 m./min. The polymer film moves over rollers 3, 4, 5 and 6 having a temperature of 195, 200, 205 and 200° C., and a peripheral speed of 3.0, 3.4, 3.9 and 4.5 m./min. respectively. At 7 the film is drawn off and after having been cooled below the crystallite melting point of the polymer material, it is wound up at 8 with a speed of 4.7 to 5.2 m./min. At the calender gaps designated 9, the polymer forms a bank rotating in itself.

If there is a danger of the material being impaired by air, the process of the invention and also the after-treatment may be carried out with the exclusion of air in an inert gas or an appropriate liquid medium. The following examples serve to illustrate the invention without limiting it thereto.

EXAMPLE 1

*Working-up of high density polyethylene*

High density polyethylene (Hostalen PM) powder, η red=4.5 (measured in a 0.5% solution of tetrahydronaphthalene at 120° C.).

Composition of the mixture to be worked up:

| | Parts by weight |
|---|---|
| Hostalen PM | 99.0 |
| Suconox | 0.3 |
| Santonox | 0.7 |

Suconox and Santonox are antioxidants produced by Sumner Chemical Company, New York 17, and Monsanto Chemicals, St. Louis 4.

After mixing the material on two heated mixing rolls, a foil 0.3 millimeter thick was produced on a five-roll-L-calender. The working conditions were as follows:

Temperature of the mixing rolls _____ 168 to 175° C.

Temperature and peripheral speed of the individual calender rolls in the direction of the flow of material

| °C | 175 | 175 | 180 | 190 | 185 |
|---|---|---|---|---|---|
| M./min | 2.6 | 2.9 | 3.4 | 3.9 | 4.4 |

The foil was wound up at a speed of 4.6 m./min.

EXAMPLE 2

*Working-up of polypropylene*

Polyproylene (Hostalen PPH), η red=9.7 (measured in a 0.1% solution of dekahydronaphthalene at 135° C.).

The polypropylene powder had been stabilized with 0.5% Suconox.

A foil 0.4 millimeter thick was prepared on the above mentioned five-roll-L-calender.

The temperature of the mixing rolls was 200 to 205° C.

The temperature and peripheral speed of the individual calender rolls in the direction of the flow of material

| °C      | 190 | 195 | 200 | 205 | 200 |
|---------|-----|-----|-----|-----|-----|
| M./min  | 2.6 | 3.0 | 3.4 | 3.9 | 4.5 |

The foil was wound up at a speed of 4.7 to 5.2 m./min.

EXAMPLE 3

*Working-up of a mixture of low density and high density polyethylene*

The example was carried out with low density polyethylene (Lupolen H/SF), $\eta$ red=0.93 and high density polyethylene (Hostalen PF), $\eta$ red=2.7 (both measured in a 0.5% solution of tetrahydronaphthalene at 120° C.).

Composition of the mixture to be worked up

Parts by weight
Lupolen H/SF _____ 49.5
Hostalen PF _____ 49.5
Suconox _____ 0.3
Santonox _____ 0.7

The temperature of the two mixing rolls was 125 to 145° C.

A 0.1 millimeter thick foil was produced on a four-roll calender.

Temperature and peripheral speed of the individual calender rolls in the direction of the flow of material

| °C      | 170 | 160 | 150 | 145 |
|---------|-----|-----|-----|-----|
| M./min  | 4.0 | 4.5 | 5.2 | 6.0 |

The foil was wound up at a speed of 10 m./min.

I claim:

1. A process for the manufacture of a smooth and uniform foil of a thermoplastic, at least partially crystalline organic polymer on a calender which comprises (1) feeding said organic polymer to a calender, all rollers of which are heated to a surface temperature above the crystallite melting point of the said polymer and each of the rollers rotating with a surface speed of at least 1.15 times the surface speed of the preceding one; the speed ratio between the first calender roller and the wind-up roller being between 1:1.5 and 1:2.5, (2) raising the surface temperature of the calender rollers until the kneading mass which accumulates in front of each of the roller gaps between two adjacent calender rollers rotates within itself around its own axis and maintaining this temperature as long as the polymer is passing through the calender, and (3) taking off the sheet from the last calender roller, cooling it down to a temperature below its crystallite melting point, and feeding it onto a wind-up roll.

2. The process of claim 1 wherein the foil is cooled by passing it over cooled rolls between the last calender roll and the wind-up roll.

3. The process of claim 1 wherein the polymer is polyethylene.

4. The process of claim 1 wherein the polymer is polypropylene.

5. The process of claim 1 wherein the polymer is a copolymer of ethylene and propylene.

6. The process of claim 1 wherein the polymer is a mixture of polyethylene and polypropylene.

7. The process of claim 1 wherein the polymer is a mixture of high density polyethylene and low density polyethylene.

8. A process for the manufacture of a smooth and uniform foil of a thermoplastic, at least partially crystalline organic polymer on a calender which comprises (1) feeding said organic polymer to a calender, all rollers of which are heated to a surface temperature above the crystallite melting point of the said polymer and each of the rollers rotating with a surface speed of at least 1.15 times the surface speed of the preceding one; the speed ratio between the first calender roller and the wind-up roller being between 1:1.5 and 1:2.5, (2) raising the surface temperature of the calender rollers until the kneading mass which accumulates in front of each of the roller gaps between two adjacent calender rollers rotates within itself around its own axis and maintaining this temperature as long as the polymer is passing through the calender, and (3) taking off the sheet from the last calender roll, stretching said sheet in at least one direction while still maintaining it at a temperature above its crystallite melting point, cooling the sheet down to a temperature below its crystallite melting point, and collecting it onto a wind-up roll.

9. The process of claim 8 wherein the foil is cooled by passing it over cooled rolls between the last calender roll and the wind-up roll.

10. The process of claim 9 wherein the stretching of the sheet is carried out by means of rolls provided with a vulcanized hard rubber coating.

11. A process for the manufacture of a smooth and uniform foil of a thermoplastic, at least partially crystalline organic polymer on a calender which comprises (1) feeding said organic polymer to a calender, all rollers of which are heated to a surface temperature above the crystallite melting point of the said polymer and each of the rollers rotating with a surface speed of at least 1.15 times the surface speed of the preceding one; the speed ratio between the first calender roller and the wind-up roller being between 1:1.5 and 1:2.5, (2) raising the surface temperature of the calender rollers until the kneading mass which accumulates in front of each of the roller gaps between two adjacent calender rollers rotates within itself around its own axis and maintaining this temperature as long as the polymer is passing through the calender, and (3) taking off the sheet from the last calender roll, cooling it down to a temperature below its crystallite melting point, imparting to the sheet the higher tensile strength by stretching it in at least one direction and collecting it on a wind-up roll.

References Cited in the file of this patent

UNITED STATES PATENTS
2,279,901    Domizi _____ Apr. 14, 1942
2,631,954    Bright _____ Mar. 17, 1953

FOREIGN PATENTS
713,200    Great Britain _____ Aug. 4, 1954